(12) United States Patent
Janowska et al.

(10) Patent No.: US 9,309,122 B2
(45) Date of Patent: Apr. 12, 2016

(54) PREPARATION OF GRAPHENE BY MECHANICALLY THINNING GRAPHITE MATERIALS

(75) Inventors: Izabela Janowska, Strasbourg (FR); Dominique Begin, Achenheim (FR); Kambiz Chizari, Calgary (CA); Ovidiu Ersen, Strasbourg (FR); Pierre Bernhardt, Heiligenberg (FR); Thierry Romero, Strasbourg (FR); Marc Ledoux, Strasbourg (FR); Cuong Pham-Huu, Strasbourg (FR)

(73) Assignees: Centre National de la Recherche Scientifique, Paris (FR); Universite de Strasbourg, Strasbourg (FR)

( * ) Notice: Subject to any disclaimer, the term of this patent is extended or adjusted under 35 U.S.C. 154(b) by 811 days.

(21) Appl. No.: 13/505,815

(22) PCT Filed: Nov. 3, 2010

(86) PCT No.: PCT/FR2010/000730
§ 371 (c)(1),
(2), (4) Date: Jun. 8, 2012

(87) PCT Pub. No.: WO2011/055039
PCT Pub. Date: May 12, 2011

(65) Prior Publication Data
US 2012/0241690 A1 Sep. 27, 2012

(30) Foreign Application Priority Data

Nov. 3, 2009 (FR) ...................................... 09 05252
Jun. 30, 2010 (FR) ...................................... 10 02719

(51) Int. Cl.
*C01B 31/02* (2006.01)
*C01B 31/04* (2006.01)
(Continued)

(52) U.S. Cl.
CPC ............. *C01B 31/0206* (2013.01); *B82Y 30/00* (2013.01); *B82Y 40/00* (2013.01); *C01B 31/0469* (2013.01);
(Continued)

(58) Field of Classification Search
CPC .......... B82Y 30/00; B82Y 40/00; H01B 1/04; C01B 31/04
USPC .............. 252/500–506; 423/445 R, 448, 461; 241/250, 237; 977/755, 900
See application file for complete search history.

(56) References Cited

U.S. PATENT DOCUMENTS 5,582,781 A * 12/1996 Hayward ............ C01B 31/0423
264/28
7,071,258 B1 7/2006 Jang et al.
(Continued)

FOREIGN PATENT DOCUMENTS

DE 102006056816 A1 10/2007
WO 2005084172 A2 9/2005
(Continued)

OTHER PUBLICATIONS

Jin et al. ("Mechanically Assisted Exfoliation and Functionalization of Thermally Converted Graphene Sheets." Chem of mater comm, 21, pp. 3045-3047, web Jun. 29, 2009).*
(Continued)

*Primary Examiner* — Tri V Nguyen
(74) *Attorney, Agent, or Firm* — Jordan IP Law, LLC; Todd A. Vaughn

(57) ABSTRACT

The preparation of graphene, mono-, bi- and multi-layers from graphite-based precursor materials, for example, pencil lead or graphite, by a method of mechanical thinning on the surface of a planar substrate with controlled roughness, followed by sonication in order to collect the graphene deposited on the substrate in a liquid medium. The bearing force during thinning by mechanical friction enables the number of graphene sheets deposited on the surface of the substrate to be controlled.

20 Claims, 8 Drawing Sheets

(51) Int. Cl.
*H01B 1/04* (2006.01)
*C08K 5/00* (2006.01)
*B02C 19/18* (2006.01)
*B82Y 40/00* (2011.01)
*B82Y 30/00* (2011.01)

(52) U.S. Cl.
CPC .......... *C01B 2204/04* (2013.01); *C01B 2204/22* (2013.01); *C01B 2204/28* (2013.01); *C01B 2204/32* (2013.01)

(56) References Cited

U.S. PATENT DOCUMENTS

| | | |
|---|---|---|
| 2002/0054995 A1 | 5/2002 | Mazurkiewicz |
| 2003/0129305 A1 | 7/2003 | Wu et al. |
| 2005/0255034 A1 | 11/2005 | Wang et al. |
| 2005/0271574 A1 | 12/2005 | Jang et al. |
| 2006/0121279 A1 | 6/2006 | Petrik |
| 2006/0231792 A1 | 10/2006 | Drzal et al. |
| 2006/0241237 A1 | 10/2006 | Drzal et al. |
| 2007/0053168 A1 | 3/2007 | Sayir et al. |
| 2008/0048152 A1 | 2/2008 | Jang et al. |
| 2008/0206124 A1 | 8/2008 | Jang et al. |
| 2008/0248275 A1 | 10/2008 | Jang et al. |
| 2008/0258359 A1 | 10/2008 | Zhamu et al. |
| 2008/0279756 A1 | 11/2008 | Zhamu et al. |
| 2009/0026086 A1 | 1/2009 | Zhamu et al. |
| 2009/0028777 A1 | 1/2009 | Zhamu et al. |
| 2009/0071533 A1 | 3/2009 | Choi et al. |
| 2009/0169467 A1 | 7/2009 | Zhamu et al. |
| 2009/0200701 A1 | 8/2009 | Kovachevich et al. |
| 2009/0200707 A1 | 8/2009 | Kivioja et al. |
| 2010/0127312 A1* | 5/2010 | Grebel et al. ................ 257/288 |
| 2011/0042813 A1* | 2/2011 | Crain et al. .................. 257/746 |
| 2012/0220198 A1* | 8/2012 | Peukert et al. ................ 451/28 |

FOREIGN PATENT DOCUMENTS

| | | |
|---|---|---|
| WO | 2006022599 A2 | 3/2006 |
| WO | 2008060703 A2 | 5/2008 |
| WO | 2008097343 A2 | 8/2008 |
| WO | 2008143692 A1 | 11/2008 |
| WO | 2009029984 A1 | 3/2009 |
| WO | 2009049375 A1 | 4/2009 |
| WO | 2009094277 A2 | 7/2009 |

OTHER PUBLICATIONS

Yuanbo, Zhang et al., "Experimental observation of the quantum Hall effect and Berry's phase in graphene", Nature, 2005, p. 201-204, vol. 438.

K.I. Bolotine et al. "Ultrahigh electron mobility in suspended graphene", Solid State Communications 146, 2008, p. 351-355.

F. Miao et al., "Phase-Coherent Transport in Graphene Quantum Billiards", Science 317, 2007, p. 1530-1533.

J. Coraux et al., "Structural coherence of Graphene on Ir (111)", Nano Letters, 2008, p. 565-570, vol. 8 (2).

T. Ohta et al., "Controlling the Electronic Structure of Bilayer Graphene", Science, 2006, p. 951-951, vol. 313.

Berger et al., "Ultrathin Epitaxial Graphite: 2D Electron Gas Properties and a Route toward Graphene-based Nanoelectronics", J. Phys. Chem. B 102 (52), 2004, p. 19912-19916.

C.H. Park et al., "Van Hove singularity and apparent anisotropy in the electron-phonon interaction in graphene", Physical Rev., 2008, p. 1134101-4, B 77(11), American Physical Society.

Frank et al. "Mechanical Properties of Suspended Graphene Sheets", J. Vac. Sci. Technol., Nov./Dec. 2007, p. 2258-2561, B 25(6), American Vacuum Society.

M. Hirata et al., "Thin film particles of graphite oxide 1: Hgh-yield synthesis and flexibility of the particles", Carbon, p. 2929-2937, vol. 42 n 14, 2004.

Reina, X. Jia et al., "Large Area, Few-Layer Graphene Films on Arbitrary Substrates by Cemical Vapor Deposition", Nano Letters 2009, p. 30-35, vol. 9 (1).

Affoune, B. Prasa et al. "Evidence of a single nano-graphene", ChemicalPHysics Lettres, 2001, p. 17-20, vol. 348.

K.S. Noselov et al., "Electric Field Effect in Atomically Thin Carbon Films", Science, 2004, p. 666-669, vol. 306.

K.S. Noselov et al., "Two-dimensional atomic crystals", PNAS, 2005, p. 10451-10453, vol. 201 (30).

K.S. Noselov et al. "Two-dimensional gas of massless Dirac fermions in graphene", Nature, 2005, p. 197-200, vol. 438.

M.I. Katsnelson, "Graphene: carbon in two dimensions", arXiv: cond-mat/0612534v1 [cond-mat.mes-hall], Dec. 30, 2006.

Fasolino et al., "Intrinsic ripples in graphene", arXiv:0704.1793v1 [cond-mat.mtrl-sci] Apr. 13, 2007.

Llamas-Jansa, C Jager et al., "Far-ultraviolet to near-infrared optical properties of carbon nanoparticles produced by pulsed-laser pyrolysis of hydrocarbons and their relation with structural properties", Carbon 45, 2007, p. 1542-1557.

N. Severin, et al., "Rapid Trench Channeling of Graphenes with Catalytic Silver Nanoparticles", Nano Letters, 9(1), pp. 457-461, online Dec. 3, 2008.

* cited by examiner

US 9,309,122 B2

PREPARATION OF GRAPHENE BY MECHANICALLY THINNING GRAPHITE MATERIALS

CROSS-REFERENCE TO RELATED APPLICATIONS

The present application is a National Stage Application of PCT International Application No. PCT/FR2010/000730 (filed on Nov. 3, 2010), under 35 U.S.C. §371, which claims priority to French Patent Application No. 0905252 (filed on Nov. 3, 2009), and French Patent Application No. 1002719 (filed on Jun. 30, 2010), which are each hereby incorporated by reference in their respective entireties.

FIELD OF THE INVENTION

This invention relates to the preparation of graphene, mono-, bi- and multi-layers from graphite-based precursor materials, such as pencil lead or graphite, by a method of mechanical thinning on the surface of a planar substrate with controlled roughness, followed by sonication in order to collect the graphene deposited on said substrate in a liquid medium. The bearing force during thinning by mechanical friction enables the number of graphene sheets deposited on the surface of the substrate to be controlled.

BACKGROUND OF THE INVENTION

Graphene is an individual sheet of graphite ("monolayer") consisting of carbon atoms in $sp^2$ hybridization mode with an arrangement according to a two-dimensional hexagonal lattice. It is one of the hardest materials known at present. At the interior of a graphene sheet, the hexagonal structure is predominant; however, some isolated units with a pentagonal or heptagonal structure may also be found, which constitute defects of the material, causing deviations with respect to a planar structure consisting exclusively of hexagonal patterns. Graphene structures formed by a plurality of superimposed sheets are also known: these structures have been called FLG ("few-layer graphene"). The thickest structures have been called NGP ("nano-sized graphene plates"). The distinction between these two terms is not very clear. The patent application WO 2005/084172 proposes the term "Carbon nanoflake" (CNF) for planar carbon forms with a thickness not exceeding 10 nm, and the term "Carbon nanosheet" (CNS) for CNFs with a thickness not exceeding 2 nm.

Most methods for obtaining graphene currently reported in the literature may be classified into five categories:

(A) The Obtaining of Graphene by a "Micromechanical" Exfoliation from HOPG (Highly Oriented Pyrographite).

This first method is described in the following articles: [1] K. S. Novoselov, A. K. Geim, S. V. Morozov et al.; Science (2004) 306, 666. [2] K. S. Novoselov, D. Jiang et al.; Proc. Natl. Acad. Sci. USA (2005), 102, 10451. [3] Y. Zhang, Y. Tan, H. L. Stormer, P. Kim; Nature (2005), 438, 201. [4] K. S. Novoselov, A. K. Geim et al.; Nature (2005), 438, 197. [5] K. I. Bolotin, K. J. Sikes, Z. Ziang et al.; Sol. State Comm. (2008), 146, 351. [6] F. Miao, S. Wijeratne, Y. Zhang, U. C. Coskon et al.; Science (2007), 317, 1530.

(B) The Obtaining of Graphene by Heating SiC at a High Temperature.

This second method is described in the following articles: [7] C. Berger, Z. M. Song, X. B. Li et al.; Science (2006), 312, (5777), 1191. [8] C. Berger, Z. M. Song, T. B. Li et al.; J. Phys. Chem. B (2004), 108 (52), 19912.

(C) The Synthesis of Graphene by Vacuum Deposition (CVD, Chemical Vapor Deposition) on a Metal Substrate.

This third method is described in the following articles: [9] J. Coraux, A. T. N'Diaye, C. Busse, T. Michely; Nanoletters (2008), 8, 565. [10] J. Vaari, J. Lahtinen, P. Hautojärvi; Catal. Lett. 55, 43 (1997). [11] D. E. Starr, E. M. Pazhetnov et al.; Surface Science 600, 2688 (1006). [12] M. Dresselhaus et al., Nano Letters, article in press (2009).

It is a synthesis in the traditional sense of the word, which proceeds chemically from gaseous compounds with a molecular mass lower than that of the product. As an example, according to a recent method described in reference [12], a hydrocarbon compound is decomposed on the surface of a metal (typically a substrate coated with a nickel film) to form a solid metal-carbon solution; after heating at high temperature, the carbon atoms segregate on the surface of the metal to form graphene sheets. The graphene sheets obtained by this method have relatively large sizes, on the order of several micrometers. However, the industrial production of graphene from this method appears to be difficult to implement.

A method for catalytic vapor deposition described in U.S. Patent Application Publication No. 2005/0255034 A1 (Wang and Baker) leads to nanofibers comprised of thin graphite plates superimposed in a direction perpendicular to the graphite planes.

(D) Synthesis of Graphene from Intercalated Graphite.

A fourth category of method uses, as the precursor, intercalated graphite of which the planes are much more spaced apart. This material is either chemically attacked or subjected to high heat in order to separate the graphite layers. As an example, document WO 2008/060703 (Directa Plus Patent & Technology Limited) describes a method for preparing very thin graphite sheets by exposing intercalated graphite sheets suddenly to temperatures of at least 1300° C. In the method described in the patent application U.S. Patent Application Publication No. 2008/0206124 A1 (inventors: Bor Z. Jang et al.), the material is attacked chemically by halogens, then heated. In another method described in the same document, the material is intercalated by halogens, then subjected, in the liquid phase, to ultrasound. In another method described in patent U.S. Pat. No. 7,081,258 B1 (Nanotek Instruments), the intercalated graphite is subjected to mechanical attrition by very fine grinding.

(E) Ultrasound Synthesis.

A fifth category of method uses ultrasound: different graphite products are dispersed in a liquid and subjected to ultrasound at ambient temperature (see U.S. Patent Application Publication No. 2008/0279756 A1 and U.S. Patent Application Publication No. 2008/0248275 A1 (inventors: Bor Z. Jang et al.).

None of these methods is selective for the synthesis of graphene in the form of monolayers or bilayers or FLG (few-layer graphene), and usually lead to structures in which a plurality, even tens of sheets are stacked. In addition, the graphene obtained by these methods is usually in the form of small sheets, e.g. several nanometers to several tens of nanometers, which are difficult to handle and difficult to deposit on supports for a more in-depth study by the techniques usually used. Moreover, the small size of these sheets makes them difficult to use in potential applications, as it causes in particular joining and assembly edge problems. These sheets have a tendency to fold so as to form complex structures (sometimes called "carbon fractals", see document U.S. Patent Application Publication No. 2006/0121279 A1); this makes it more difficult to study the fundamental properties of this material, and complicates studies aimed at the potential applications of these materials. The patent application U.S. Patent Application Publication No. 2006/0121279 A1 describes a method for producing carbon nanotubes from graphenes by applying high pressure and high temperature.

Because it is so difficult to obtain, graphene is one of the most expensive materials. Its price may decrease significantly if more effective synthesis methods were available, along the lines of what was observed in the field of carbon nanotubes toward the end of the 1990s in which a major price drop was enabled as synthesis methods were optimized, enabling larger amounts of nanotubes to be obtained with better selectivity, in this case by CCVD (catalytic chemical vapor deposition) growth methods.

In spite of the existence of a number of types of laboratory methods enabling very small amounts of graphenes to be obtained, there is a need to develop new graphene synthesis methods that are more efficient, so as to be capable of studying its physical, chemical and mechanical properties; these studies may make it possible to confront the predictions of different theories with experimental results. In this context, it is also very beneficial to be capable of synthesizing larger graphene sheets, i.e., at least micrometric, so as to better master their deposition on receiving surfaces (substrates) and obtain results that are more easily interpretable and more easily comparable to those obtained for conventional carbon materials.

There is also a need to develop new methods for synthesis of graphene that are simpler and that use inexpensive and abundant starting materials, and to avoid, insofar as possible, the use of chemical reagents or high synthesis temperatures, with the possibility of industrial production, for cases in which graphene has industrial applications; such methods do not currently exist.

SUMMARY OF THE INVENTION

The invention relates to a method for producing a dispersion of graphene particles or sheets in a liquid medium L, including the following steps: (a) a bar or block of graphite-based massive material M is provided; (b) said material M is rubbed on the surface S of a substrate so as to create a trace of friction of said material M on said surface S of said substrate; (c) said substrate is soaked in a liquid medium L and said liquid medium L is subjected to ultrasound in order to obtain a dispersion of graphene particles or sheets in said liquid medium L, in which method steps (b) and (c) can be performed at least partially in sequence, or simultaneously.

The method may also comprise a step (d) in which any organic or inorganic materials present in said dispersion are separated, preferably by sedimentation or centrifugation, or by chemical dissolution. It may comprise a step (e) in which graphite particles and/or graphene sheets having an excessive thickness that may be present in said dispersion are separated, preferably by sedimentation or by centrifugation. Thus, a dispersion low in graphite particles and graphene sheets of which the thickness exceeds a desired value is obtained. The method according to the invention can also comprise a step in which the desired graphene sheets are collected from said suspension.

Said surface S 2 advantageously has a roughness of between 0.01 μm and 10 μm.

Advantageously, said graphite-based material can be chosen from pencil lead, natural graphite and synthetic graphite.

Said liquid phase L may be a reducing medium, and advantageously comprises a reducing agent selected from the group consisting of: $NaBH_4$, hydrazine and ammoniac.

The bearing force of said material M on said surface S is advantageously between 100 Pa and 500,000 Pa, preferably between 100 and 300,000 Pa, more preferably between 100 and 7000 Pa and even more preferably between 1000 Pa and 6000 Pa.

The speed of friction between said material M and said surface S is advantageously between 0.001 $m.s^{-1}$ and 0.1 $m.s^{-1}$.

Said substrate is advantageously selected from the polymers, preferably flexible and/or transparent polymers, glasses, ceramics and silicon. Metal materials with a suitable roughness can also be used.

In one embodiment, said surface S of said substrate and said massive material M are in relative displacement according to at least two axes, so as to cause a lateral offset between two adjacent segments of traces of said material M on said surface S. Said substrate is advantageously a disk capable of rotating about its axis, and in which the trace of friction of said massive material M on said surface is continuously or periodically offset by lateral displacement means (i.e. orthogonal to the rotation axis of the disk) so as to obtain a continuous trace, preferably in the form of a spiral.

In an advantageous alternative of the method according to the invention, steps (b) and (c) are performed at the same time, and at least some of said dispersion is collected periodically or continuously.

In another alternative, which is advantageously combined with the previous one, said dispersion is subjected to a second ultrasound treatment, preferably with an ultrasound power and/or a duration greater than those in step (c). It is also possible to use a microwave treatment.

The invention also relates to a method for preparing graphene particles or sheets, in which a dispersion of graphene particles or sheets is prepared according to any one of the embodiments and alternatives of the method according to the invention, followed by one or more steps in which the graphene particles or sheets are collected from said suspension.

The invention also relates to a device for implementing the method in accordance with the invention, including: means capable of holding said bar or block of massive material M; a substrate equipped with a surface S capable of being in contact with said bar or block of massive material M; means for displacement enabling a relative displacement between said massive material M and said substrate to be generated; means for regulation and/or control of the pressure force enabling the pressure force between said massive material M and said surface S of said substrate to be kept constant and/or measured during said relative displacement; a liquid container enabling the surface S to be at least partially immersed in a liquid phase; and an ultrasound generator enabling said liquid to be subjected to ultrasound.

BRIEF DESCRIPTION OF THE DRAWINGS

FIG. 1 illustrates a curve representing the correlation between the pressure exerted by the material M on the surface S of the substrate and the electrical resistance between the tip of the pencil lead and the surface S of an electrically conductive disk, in which said pressure is produced by a pressure sensor. The insert diagrammatically shows the device for measuring the pressure exerted by the pencil lead on the surface of the solid substrate.

LIST OF REFERENCES

2: bearing surface S (disk with a surface of 100 $mm^2$)
5: pencil lead (or graphite-based material)

Figure 2:
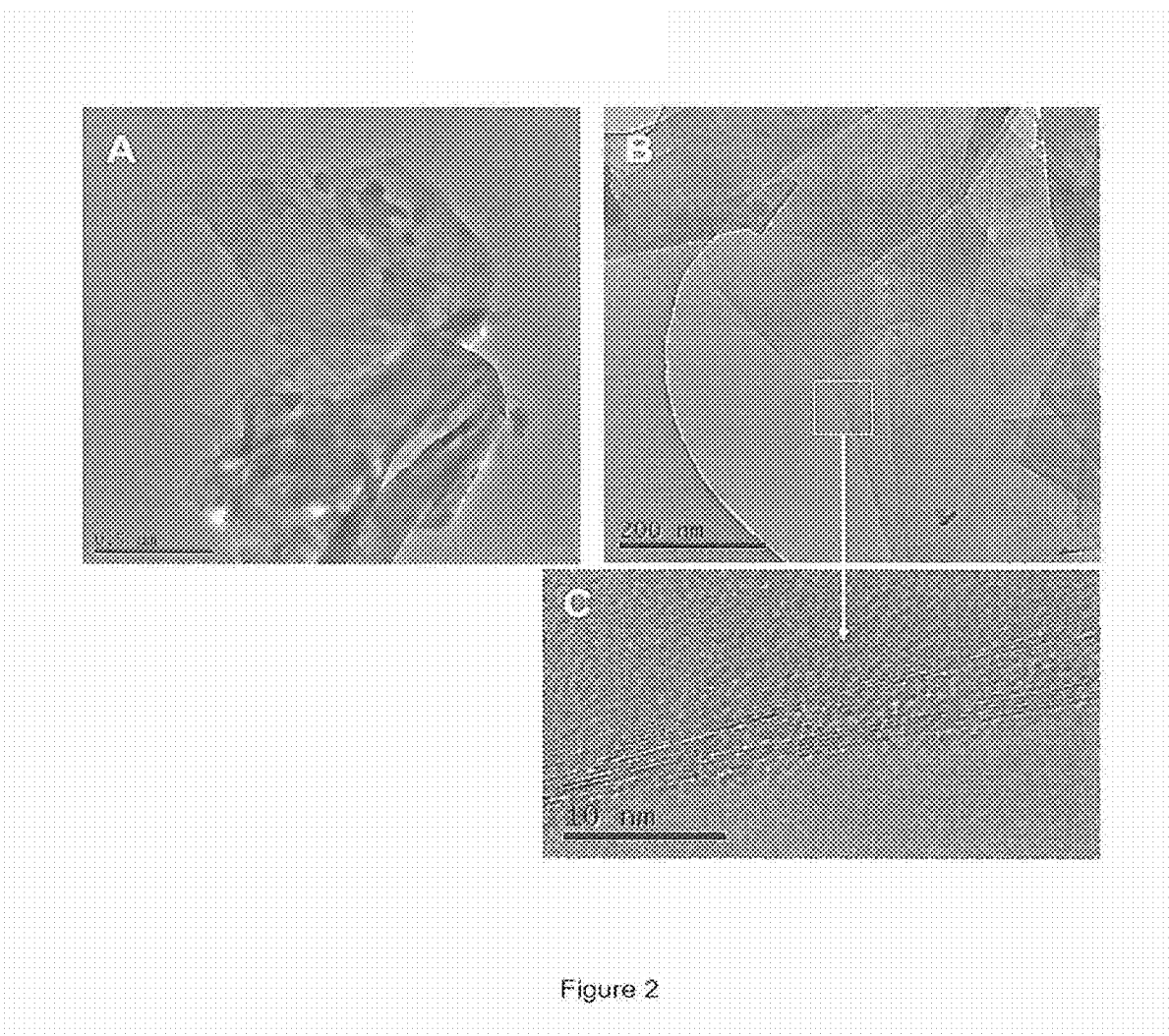

8: pressure sensor
9: PTFE weight support
10: interchangeable weight
11: stationary glass support for holding the pencil lead FIG. 2 illustrates three images obtained by Transmission Electron Microscopy (TEM) of the graphene sheets obtained according to the invention by mechanical friction of a pencil lead on a surface of a glass substrate with a roughness of 1 μm.

The length of the bar corresponds to 0.5 μm (A), 200 nm (B) and 10 nm (C).

(A): low-resolution TEM image showing that the graphene sheets obtained have a mean size of several micrometers squared.

(B): medium-resolution TEM image showing that the graphene sheets synthesized by the present invention are of the multilayer type.

(C): high-resolution TEM image of the area indicated in image (B) showing the number of graphene sheets of the sample, which is four and eight sheets, respectively.

Figure 3:
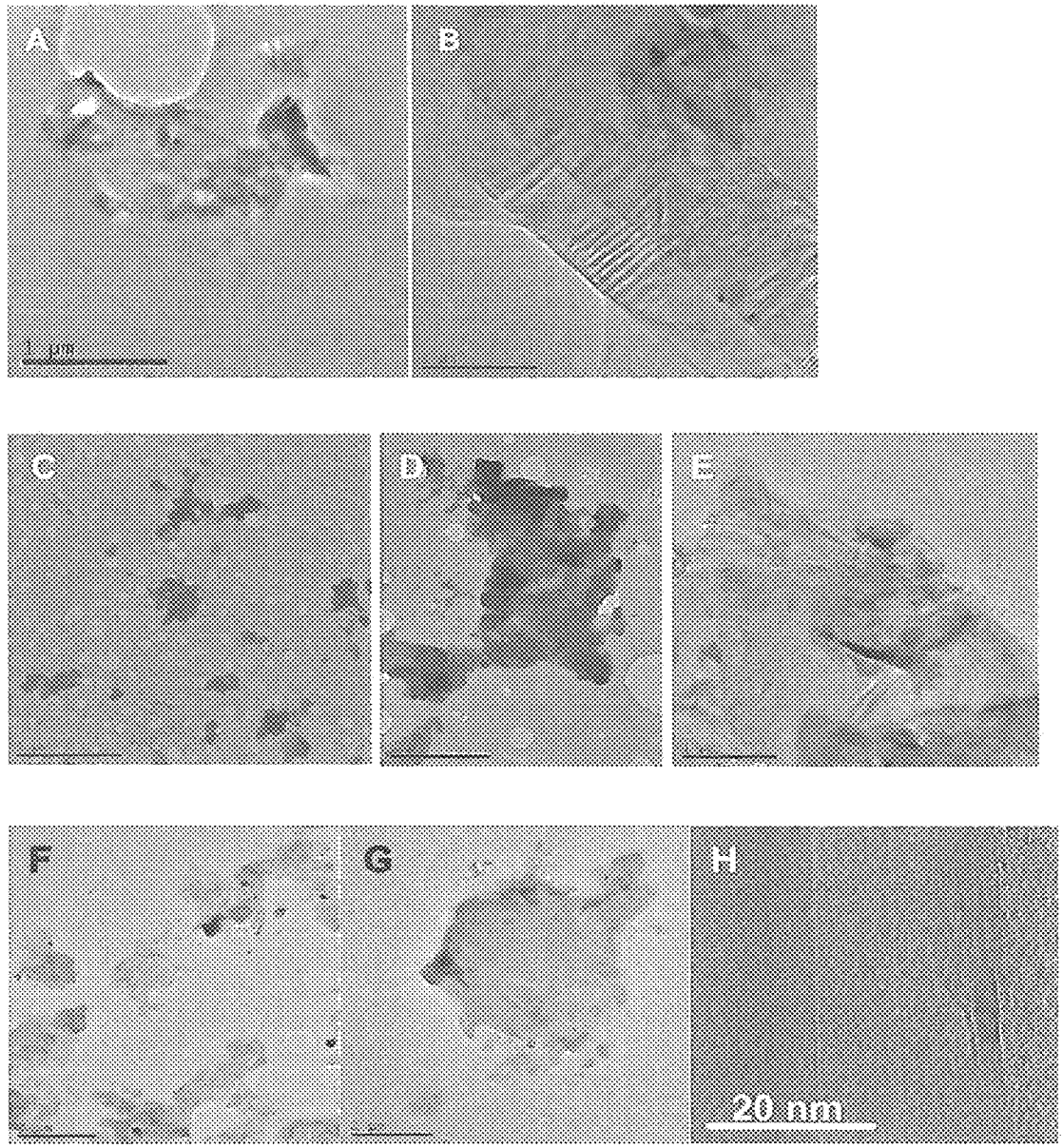

FIG. 3 illustrates images obtained by TEM of graphene sheets obtained according to the invention after sedimentation of 5 minutes (images A and B), 20 minutes (images C, D and E) and 40 minutes (images F, G and H). Image (H) is a high-resolution TEM image showing that the FLG contains seven graphene layers.

The length of the bar corresponds to 1 μm (A) and (B), 5 μm (C), 2 μm (D), 1 μm (E), 2 μm (F) and (G) and 20 nm (H).

Figure 4:
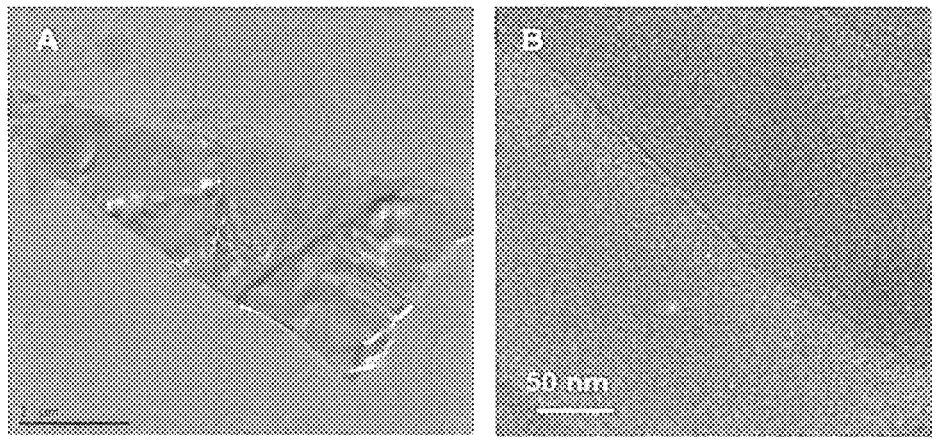

FIG. 4 illustrates TEM images of the graphene sheets obtained according to the invention by mechanical friction of a pencil lead on a glass substrate with a roughness of 1 μm.

(A) low-resolution TEM image showing that the graphene sheets obtained have a mean size of several micrometers or more. Length of the bar: 1 μm.

(B): high-resolution image showing that the FLG consists of two graphene layers. Length of the bar: 50 nm.

Figure 5:
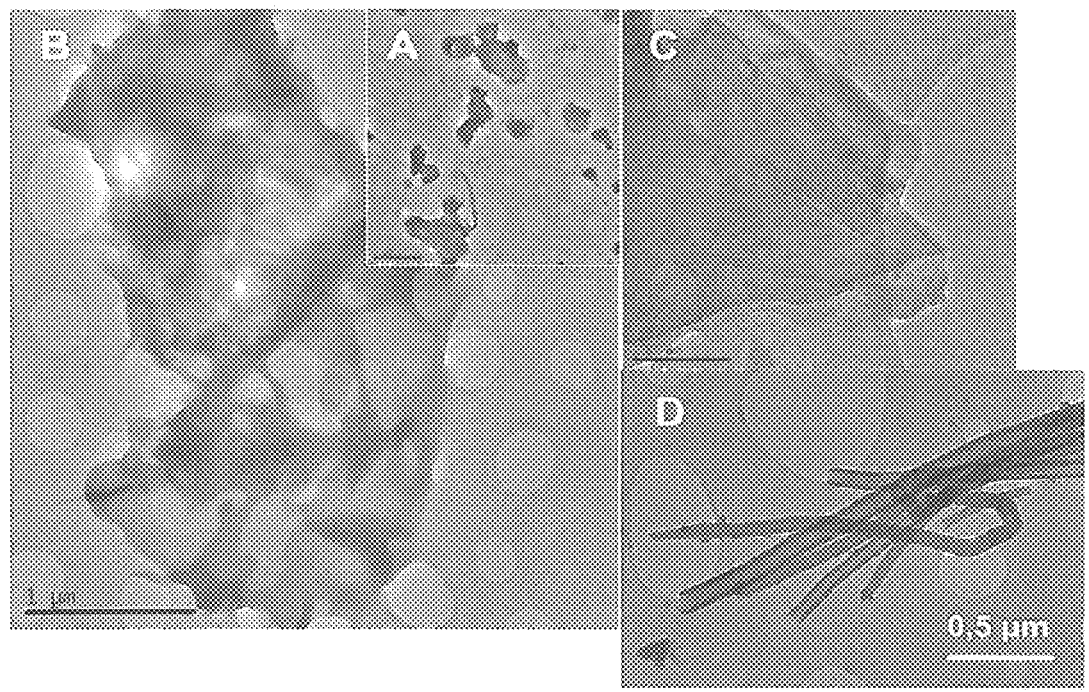

FIG. 5 illustrates TEM images of graphene sheets formed according to the invention by sonication of a friction trace in an ethanol solution followed by heating at 80° C.

The length of the bar corresponds to 2 μm (A), 1 μm (B), 100 nm (C), and 0.5 μm (D).

Figure 6A:
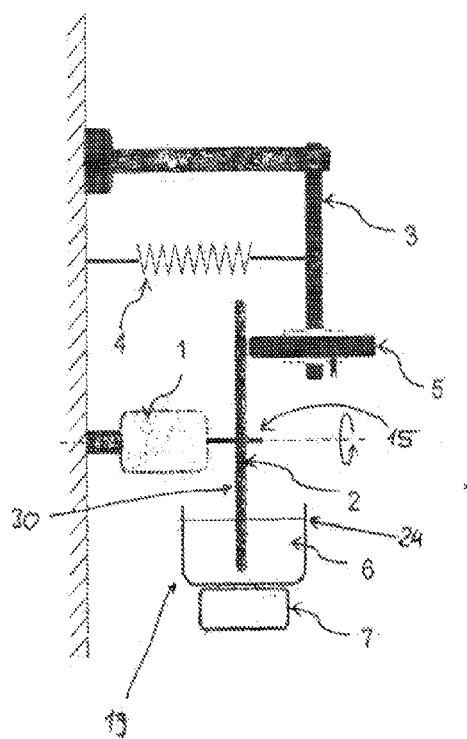
Figure 6B:
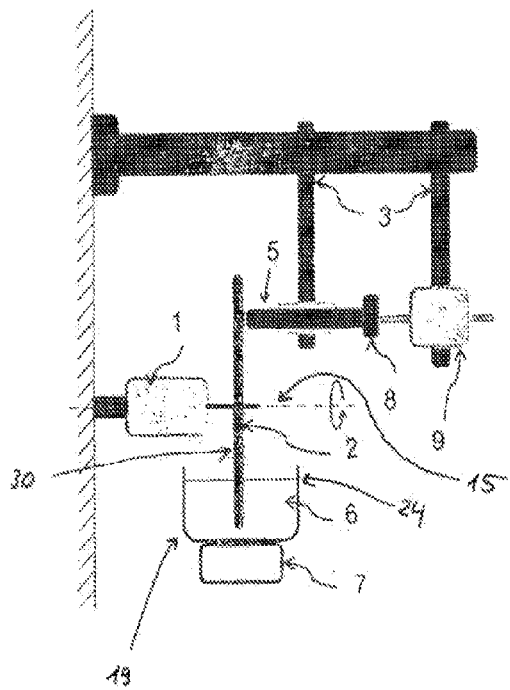
Figure 8:
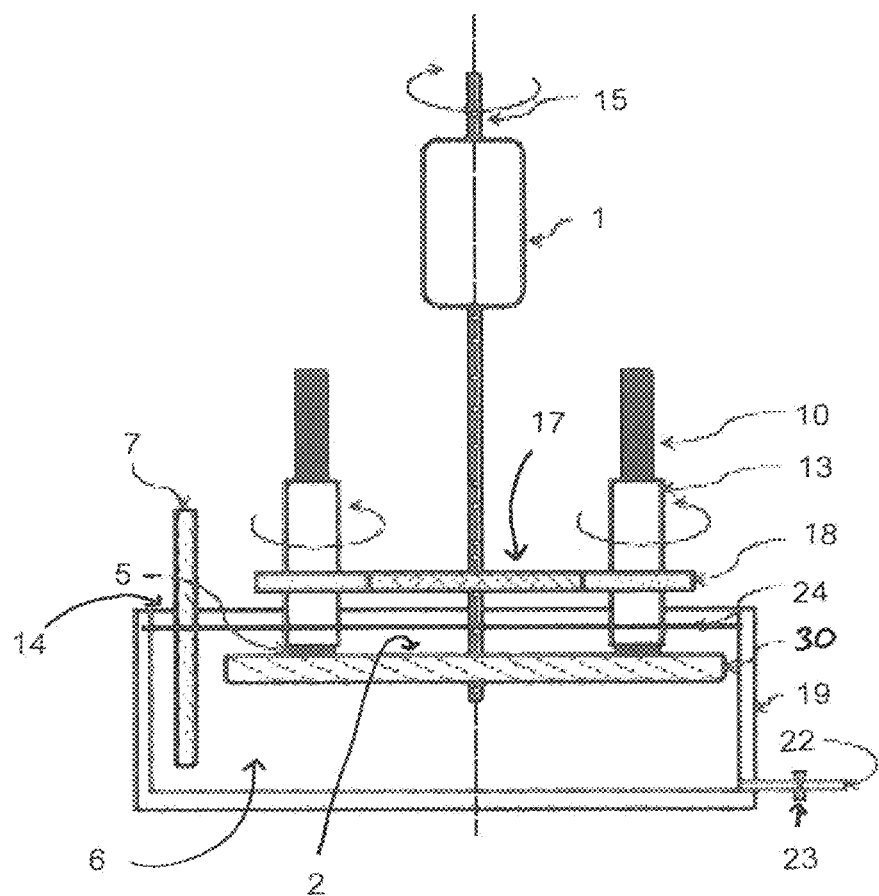
Figure 9:
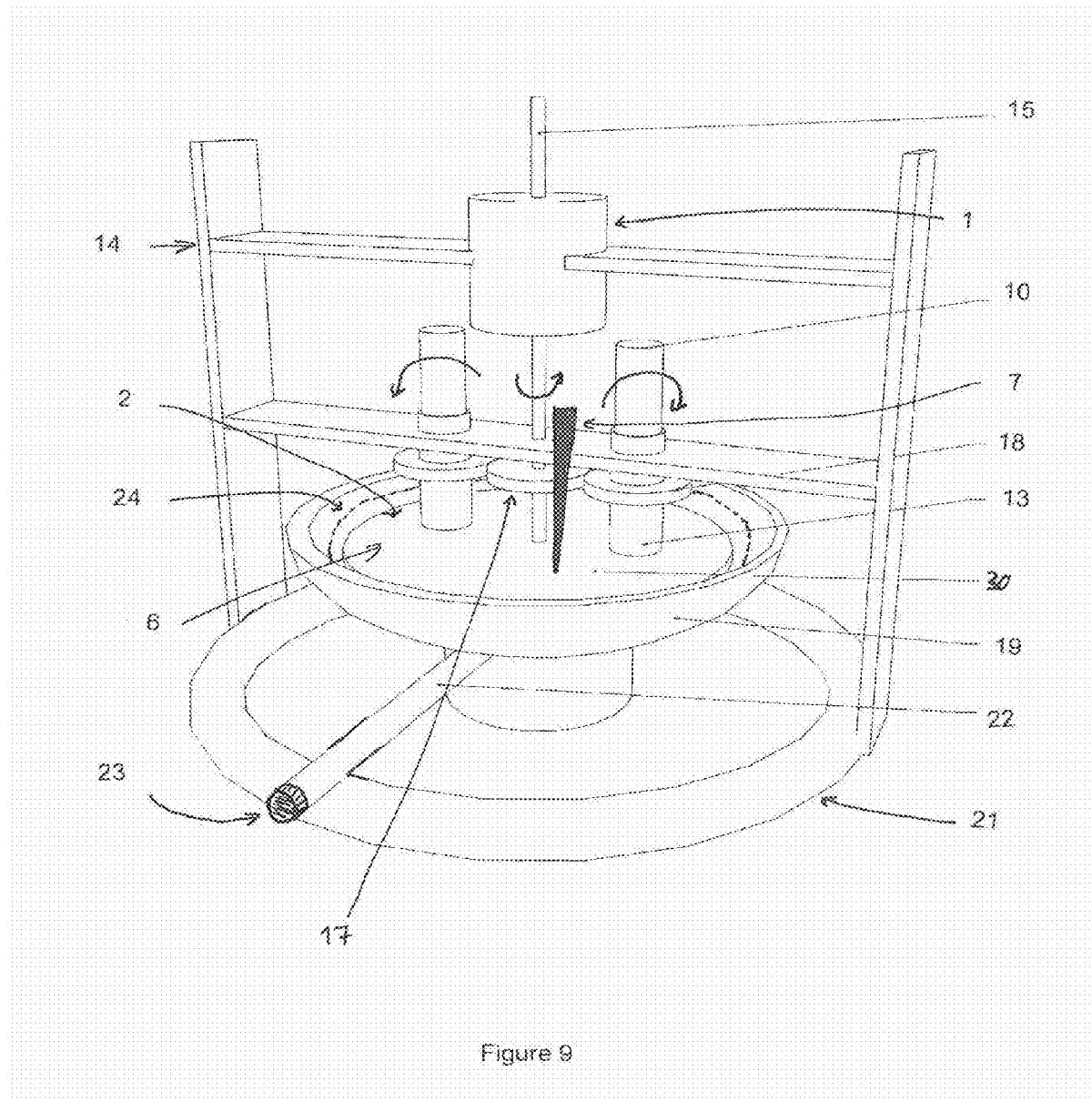

FIGS. 6, 8 and 9 illustrate four devices according to the invention used for a continuous production of multilayer graphene sheets by mechanical friction of a graphite-based material on a surface of a rough substrate.

FIG. 6 (A) illustrates a device using return means (such as a spring).

FIG. 6 (B) illustrates a device using a positioning servomotor.

FIGS. 8 and 9 illustrate devices using a weight, respectively.

ADDITIONAL LIST OF REFERENCES FOR FIGS. 6, 8 AND 9

Figure 7:
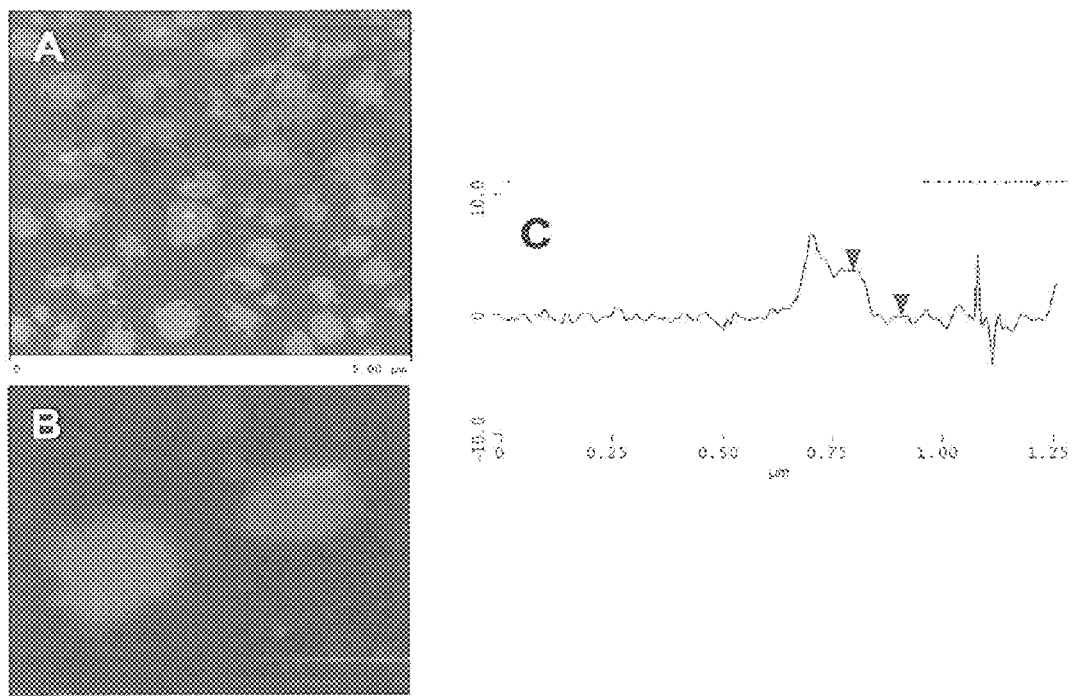

1: motor for rotation of the disk
2: abrasive surface S (for example, surface of a ground glass disk)
3: hinged arm
4: return spring secured to the graphite bar
5: graphite bar
6: liquid phase (for example, water, ethanol, toluene)
7: ultrasound generator
8: pressure sensor
9: positioning servomotor
10: weight
13: tube containing graphite
14: frame 15: spindle
17,18: transmission elements
19: container
21: support
22: drainage means
23: flow rate control means
24: level of the liquid.
30: disk FIG. 7 illustrates atomic force microscopy images of the FLGs obtained by the method according to the invention, dispersed on a SiO2/Si-based substrate (A, B) and the height of the FLGs measured by atomic force microscopy (C). The mean height is 4 n, which represents a stack of four graphene layers. Image (A) shows a square with dimensions 5 μm×5 μm. Image (B) shows the enlargement of two FLGs.

DETAILED DESCRIPTION OF EMBODIMENTS

In their search for methods making it possible to produce graphene in the form of sheets with a thickness not exceeding some ten layers and preferably of one or two layers and having relatively large width and length dimensions, the inventors found a new method that is extremely simple and easy to carry out on an industrial scale, involving the friction of a graphite-based material (hereinafter called "M") on the surface of a substrate (hereinafter called "S"), preferably planar, that has a certain surface roughness, followed by a sonication treatment in a suitable liquid medium (hereinafter called "L").

With this method, it is possible to obtain graphene sheets with a typical thickness of between 1 and 50 nm and having graphite planes superimposed in accordance with the vertical axis. The number of parallel graphene sheets is advantageously between 1 and 50, preferably between 1 and 30, and even more specifically between 1 and 15. Said graphene structures advantageously have a size of which the length and width are at least 10 nm×100 nm, preferably at least 50 nm and 500 nm, and even more preferably at least 100 nm×5 μm.

Below, we will describe in detail the different steps of the method, as well as particular embodiments and alternatives of the method. In this description, the term "synthesis" does not refer to a chemical synthesis of graphene but rather to the production of graphene from a graphite material.

a) Graphite-Based Material M and Substrate S

Any graphite-based massive material M can be used in the context of the method according to the invention. It must contain a significant proportion of graphite, typically at least 10% by mass, advantageously at least 30% by mass, and even more preferably at least 50% by mass. The material M can be in the geometric shape of a rod or a block, with a cylindrical, rectangular or square cross-section, or in any other suitable shape. Below, we use, for these geometric shapes, the terms "block" or "bar" synonymously, even if it is a pencil. The size of the blocks of material M may be variable according to the intended applications. Their hardness may also be variable.

The preferred materials M are pencil lead and graphite bars. Pencil lead includes a graphite-based material and a mineral binder finely divided into variable proportions. The graphite blocks or bars may, for example, be blocks of natural graphite or blocks obtained by compaction (compression) of natural graphite pieces, with or without a binder.

The substrate S may be electrically conductive or, preferably, non-conductive. It is advantageously selected from glass-based materials, such as ground glass, silica, silicon coated or not by a SiO$_2$ passivation layer, or a polymer with a suitable hardness. Its surface roughness must be suitable for the hardness of the materials M. Preferably, the roughness $R_a$ is between 0.01 µm and 10 µm.

b) Deposition of the Trace (Friction)

The method in accordance with the invention is based on the mechanical ablation or abrasion of graphene sheets by action of a rough surface of a substrate S 2, preferably of a planar substrate, on a graphite-based material M 5. This ablation is performed by depositing, by friction involving a relative movement between the material M and the surface S located in mechanical contact, a trace of said graphite-based material on said surface S. Thus a transfer of the material M onto the surface S is performed. This transfer leads to a trace. A plurality of friction movements may be superimposed to form a single trace. Said trace is normally visible to the naked eye, in the form of a gray-black line, as is produced when writing with a pencil lead.

The surface S may be dry during the deposition of the trace, but in this case it is more difficult to later detach the graphene sheets deposited by mechanical ablation of the graphite-based material. It is preferable for the surface S to be immersed in a liquid during the deposition of the trace. Advantageously, said surface S is then subjected to a sonication treatment in order to better detach the graphite traces deposited on its surface in a liquid medium L. The additional sonication treatment combined with friction of said graphite-based material on a solid substrate is a better combination for obtaining thin graphene sheets.

Figure 1:
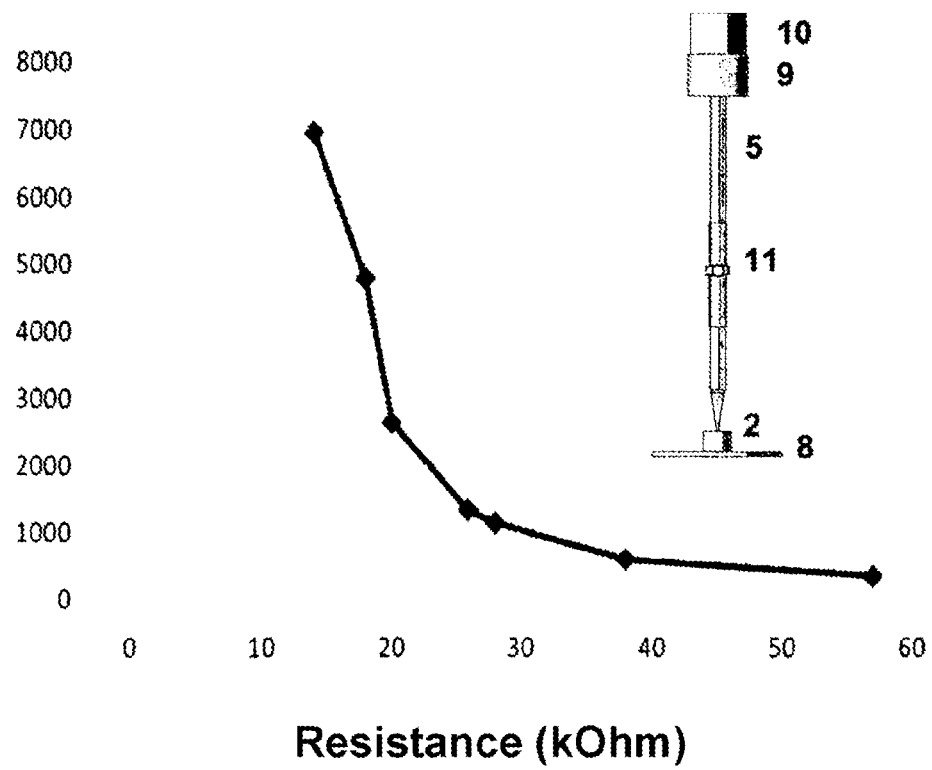
FIGS. 1 to 9 relate to embodiments of the invention.

It is advantageous to successfully control the bearing force of the material M on the surface S. In particular, it is advantageous for this force to be low, because this promotes the deposition of graphene sheets comprising a small number of graphite planes. However, it must be sufficient to obtain a sufficient production of graphene sheets. The correlation between the pressure exerted by the material M (for example, a pencil lead or a graphite bar) and the resistance measured on a pressure sensor is shown in FIG. 1. The measurement device is shown in the insert of FIG. 1.

The pressure exerted is calculated by the following formula: $P=(M \times g)/S$ with: P: pressure in Pa, M: mass deposited on the pencil lead in kg, g: gravitational constant in $N.kg^{-1}$, and S: bearing surface in $mm^2$.

The electrical resistance is an inverse function of the pressure exerted. In FIG. 1, the X-axis represents the resistance measured (expressed in kOhm) and the Y-axis represents the pressure exerted (expressed in Pascal).

In general, the pressure may be between 100 and 500,000 Pascal, preferably between 100 and 300,000 Pascal, but in certain embodiments, it is preferable for the pressure to be between 100 Pa and 7000 Pa, preferably between 1000 Pa and 6000 Pa, and even more preferably between 2000 Pa and 5000 Pa.

c) Ultrasound Treatment (Sonication)

This treatment is very important for enabling the FLGs and deposits on the surface of the substrate to be collected, and also for enabling an additional separation of the graphite sleets deposited on the substrate between them. It also enables a graphene dispersion to be obtained in a liquid medium L 6. To this end, the surface S 2, which bears the trace of material M 5 is treated in a bath of said solvent (or another suitable solvent) with ultrasound. Alternatively, the ablation method may be performed entirely in an ultrasound bath, i.e. when the trace of material M is deposited on the surface S, said surface is already immersed in said solvent and is exposed to the ultrasound. The suspension containing the FLGs, residual graphite and binders may be drawn off the bath during synthesis and replaced by a clean solvent. After sedimentation and collection of the different solid phases present in the suspension, the solvent may be reinjected into the ultrasound bath.

The FLGs in suspension thus obtained may be re-treated, either by heading under microwave irradiation or by a sonication treatment with a power and/or for a longer duration, in order to improve the separation of the graphene sheets constituting the FLG.

Without wanting to be limited in this explanation, the inventors imagine that the energy supplied by the sonication makes it possible to detach the graphene sheets deposited on the surface S and to disperse the latter in the liquid medium. A suspension of graphene sheets is thus obtained.

The nature of the liquid L in which the sonication has taken place is an important factor in the production process. Indeed, depending on whether the liquid medium 6 is protic or aprotic, the amount of oxygen chemisorbed on the surface of the graphene sheets may vary and induce significant changes on the conductivity of the final material.

The wettability of the graphene sheets by the solvent also plays an important role in the ablation of the sheets during sonicaton. The choice of the solvent L influences the output of the method: the outputs obtained by this method typically vary from 20 to 60% according to the solvent used.

If the material M comprises non-graphite materials, a step of sedimentation of the suspension obtained may be necessary. As an example, if the material M consists of a pencil lead, a trace is deposited that also includes binder residue, which is present in general in the form of mineral powders (typically kaolin and bentonite) of which the content may vary from several percent to around 30% in the case of HB pencil leads. When the synthesis is performed in an aprotic medium, an additional purification step may be added to the method: a known amount of acidified water is added to the suspension and it is mixed for around 1 hour. The acid enables at least partial dissolution of the binders, which thus change to the aqueous phase. The mixture is settled, then the aqueous phase is separated from the organic suspension containing the FLGs.

In a particular embodiment, said liquid medium 6 is a reducing medium. For example, it may contain suitable reducing chemical compounds, such as $NaBH_4$, or hydrazine or ammoniac. This improves the conductivity of the graphene sheets (probably by reducing oxygen-containing groups at the surface or on the edge of the sheets). This also makes it possible to selectively keep the thin graphene sheets, for example, monolayer, bilayer or trilayer sheets in suspension in the liquid medium, and they may then be used in the desired applications.

The FLGs thus obtained may also be dried after deposition on a substrate followed by a reduction under a hydrogen current in order to remove the oxygen-containing surface functions and increase the electrical conductivity. As an example, the electrical conductivity measured on a glass plate covered by a FLG layer (with a length of 16 mm and a thickness of around 400 nm) was 3 $S.m^{-1}$. This conductivity increases significantly, 250 $S.m^{-1}$ instead of 3 $S.m^{-1}$ when the sample is reduced under a hydrogen current at 200° C. for 2 h. The conductivity value obtained by this applicant is relatively high with respect to that obtained by Choucair et al. (M. Choucair, P. Thordarson, J. A. Stride, Nature Nano. 4, 30-33 (2009)), from graphene by solvolysis followed by sonication of sodium ethanolate with relatively high outputs, which is only 0.067 $S.m^{-1}$.

In another embodiment of the method in accordance with the invention, after steps (a) (supply), (b) (friction) and (c) (ultrasound treatment in liquid medium) are carried out, the entire solid material in suspension is separated, for example by filtration. This solid material contains in particular graphene and possible binders of the graphite-based material M. Then, this solid material is re-dispersed in a deionized water volume. This dispersion is treated by an acid solution, preferably hydrochloric acid, in order to dissolve some of the binders and soluble impurities. A treatment with 37% by volume of hydrochloric acid at 80° C. for 1 hour is suitable. Then, the solid residue is separated, washed with deionized water and redispersed in the deionized water, which is treated with a basic solution. The separated solid is redispersed in a deionized water volume, then subjected to an ultrasound treatment, for example for an hour. It is left to settle, preferably at ambient temperature for one hour, then the graphene is collected. The graphene thus obtained may be kept in dispersion, or it may be separated, for example by filtration, so as to be redispersed in another solvent or stored in the form of a powder, in air, or, preferably in a controlled atmosphere.

The thermogravimetric analyses (TGA) performed on the graphene collected from the suspension show a significant concentration of non-combustible impurities, capable of reaching 30% by weight of the graphene-based material M. This result is even more surprising given that the content of impurities (binder and other) in the pencil used as the starting material M, obtained by combustion at 1000° C., is only 15%. Without wanting to be limited by a scientific explanation to explain these results, the inventors put forth the following hypothesis: during exfoliation by ultrasound treatment, the graphene sheets formed develop a larger adsorption surface than that of the graphite-based material M; similarly, the ultrasound treatment may create new surface defects, which constitute new adsorption sites for the impurities. This may explain the significant increase in the impurities content by weight of graphene observed by TGA.

The inventors found that, for certain applications such as catalysis or reinforcement of materials, the presence of such impurities does not necessarily pose a problem. For applications concerning the field of electronics or conductive polymers, the presence of impurities may, however, influence the electrical and thermal conductivity of the material obtained. In these cases, it is advantageous to purify the product in order to remove these impurities. This purification may be performed in accordance with any suitable method. Two suitable methods are indicated here: (i) if the binders are based on kaolin: a treatment with diluted hydrofluoric acid (2 to 5%); and (ii) if the binders are based on alumina or silica: a treatment with soda (20%) at 80° C.

Thus, a purified graphene dispersion is obtained, which is suitable for all applications; if necessary, it is possible to separate the graphene from the liquid base in order to obtain it in powder form.

d) Deposition of Graphene Traces on a Substrate in Accordance with a Predefined Schema In an alternative of the method in accordance with the invention, traces of material M are deposited, by friction with a graphite-based material, on the surface S of a substrate, preferably a non-conductive substrate, in accordance with a predetermined geometric schema. It is thus possible to form conductive traces on a solid or flexible support, possibly transparent. It is thus possible to prepare substrates for electronic devices, in which said traces form electrical circuits or portions of electrical circuits, for example for subsequent thin film deposition; such devices may be used in photovoltaic applications. In one embodiment, flexible and transparent electrodes are thus produced by deposition of traces of material M on a flexible and transparent polymer.

This deposition operation may be followed by sonication of the substrate so as to preserve only the number of graphene sheets necessary for producing the desired circuit.

e) Output of the Method

The output of the graphene particle or sheet production method is advantageously greater than 3% by mass with respect to the mass of starting material M consumed, preferably greater than 10% and advantageously greater than 40%. These output values correspond to the mass of graphene sheets with respect to the loss of mass of material M. If reference is made solely to the mass of graphite material of material M, without taking into account the non-graphite materials that it may contain, this output may even reach 60%. No known graphene preparation method enables such a high output to be obtained without the use of chemical synthesis, to the knowledge of the inventors.

f) Use and Advantages of the Method in Accordance with the Invention

The method in accordance with the invention has numerous advantages. In general, it leads to multilayer graphene, of which the number of sheets does not exceed some twenty sheets, which are easy to separate from the substrate by simple sonication in a suitable liquid medium. It makes it possible to prepare a dispersion of graphene sheets in a liquid medium, of which the nature may be adjusted in accordance with the intended applications. Thus, the multilayer graphene is in dispersion in a liquid medium and may then be used in different methods, such as methods for producing composite materials either by direct deposition on a substrate or by mixing with another suitable product, for example in order to produce the final composite.

This invention differs from the existing methods, such as friction of a pencil lead or a graphite bar on a paper sheet-based or silicon-based substrate, in that it uses a substrate, preferably rigid, of which the roughness is controlled, and an intermediate or simultaneous sonication in order to detach the graphene sheets deposited on the surface 2 of the substrate in a liquid medium 6. The method makes it possible to continuously synthesize graphene sheets; it has adjustable parameters (in particular the friction force, the lateral friction speed, the roughness of the substrate, the sonication power, the chemical nature of the liquid medium), which enable the product obtained to be optimized.

FIG. 6 shows a first embodiment of a continuous apparatus. Advantageously, the graphite material 5 is a graphite bar, and the substrate 2 is a rough glass plate with a mean roughness on the order of 1 μm measured by profilometry. In this embodiment, the substrate 2 is driven and is displaced laterally with respect to the graphite bar 5 in order to deposit the trace, but it is also possible to produce, in the context of this invention, an apparatus in which the graphite bar is laterally displaced with respect to the substrate. Said displacement of the substrate 2 with respect to the graphite bar 5 is performed by lateral displacement means such as a servomotor. In an alternative of this method, said lateral displacement is a continuous revolution of the substrate 2 or of the bar 5, with a lateral increment enabling a continuous trace in a spiral or other form to be obtained.

In an advantageous embodiment, the surface 2 on which the trace is deposited is immersed in an ultrasound bath comprising a liquid phase L during the deposition of said trace.

Several embodiments of the friction of the graphite material on the surface 2 of the solid substrate are described in greater detail below.

In a first embodiment, a circular friction of the material M 5 with different diameters on said surface 2 of the solid substrate is performed. In this alternative, the graphite material is stationary in accordance with the XY plane defined by the planar substrate, and only the displacement in Z (perpendicular to the surface of the solid substrate) is effective as the graphite material is consumed. Advantageously, the bearing force between the graphite material M and the surface of the substrate 2 is controlled throughout the method.

In a second embodiment, a circular friction with a modulation of the amplitude of the graphite material in accordance with the XY plane is produced. The displacement of the graphite material in accordance with the Z-axis is maintained as in the previous embodiment. The movement of the graphite material in accordance with the XY plane may be vertical or pendular.

The output and quality of the FLGs obtained may be controlled by means of the following parameters: the rotation speed of the rough substrate, the pressure exerted by the graphite material on the surface of the substrate, the hardness of the graphite material, the power of the ultrasound generator 7, the nature of the liquid medium 6 in which the extraction of the FLGs takes place.

The liquid thus filled with FLGs, graphite debris and binders is periodically or continuously removed so as to perform the separation of the FLGs. If the liquid 6 is an organic solvent, a portion of the binders, kaolin and bentonite, may be separated from the suspension by adding water or acid, which promotes the dissolution of the binders in the aqueous medium before the separation and sedimentation in order to collect the FLGs. The suspension containing the FLGs thus separated from the binders may then be concentrated by means available to a person skilled in the art, such as vacuum evaporation with heating or not, and centrifugation. The liquid removed from the FLGs may then be recycled in the ultrasound bath. If an aqueous solvent is used, the binders may be separated by dissolution in the medium by adding acid, then centrifugation is performed in order to collect the FLGs for subsequent use.

FIGS. 8 and 9 illustrate other devices for implementing the method in accordance with the invention; FIG. 8 illustrating the preferred embodiment. The device includes one or more blocks, bars or rods of graphite-based material 5, arranged inside at least one tube 13, preferably cylindrical, held in a frame 14 so as to be capable of rotating around its long axis. A controlled downward force is exerted on said graphite-based material 5; it may, for example, be ballasted by a weight 10. The lower surface of said graphite-based material 5 rubs on the abrasive surface 2 of a disk, which performs a rotation movement around a spindle 15 moved by a motor 1, which may be attached to the frame 14. To this end, it is possible to have transmission elements 17, 18 on the spindle 15 and the tube 13, which cooperate to cause the tube 13 to rotate in the desired direction. Said transmission elements 17, 18 may include elements that cooperate by a simple pressure contact (for example, O rings made of polymer materials) or elements forming a gear system.

The disk 2 may be circular, and the spindle 15 may pass through its center. The spindle 15 may also be off-center, and/or the disk may have a shape other than circular, and, in these cases, the fraction of the abrasive surface of the disk 2 on which the graphite-based material 5 rubs is enlarged. The disk 2 is located in a container 19 (such as a pan), which contains the liquid phase 6, so that the upper surface of the disk 2 is immersed in said liquid 6. An ultrasound generator 7 transmits, to the liquid 6, mechanical energy at an ultrasound frequency. As an example, said ultrasound generator 7 may be a tubular element (ultrasound "pencil" or "finger"), of which the end is soaked in the liquid phase 6, or it may be arranged in the base 20 of the container 19. The container 19 may be equipped with a support 21, for example annular, in order to confer good stability on the device (FIG. 9).

In an alternative (not shown in the figures) of this embodiment, the motor 1 is located below the disk 2, for example in the base 20 of the container 19; it is then necessary to ensure a proper tightness between the spindle 15 and the container 19.

Advantageously, the container 19 is equipped with drainage means 22, which may be a pipe, and which are advantageously equipped with flow rate control means 23, such as a valve; these flow rate control means 23 may be automatic control means, for facilitating the operation of the continuous process; it may advantageously be a complete closure (zero flow rate). It is possible to provide a filling device (not shown in the figures), which enables the liquid phase 6 to be renewed as it is collected from the bottom of the container 19 through the drainage means 22; it is thus possible, periodically or constantly, to remove the liquid 6 in order to collect the graphene dispersion, while keeping the level 24 of liquid 6 in the container 19 constant. The components of the device may be made of any suitable material, for example metal, glass or polymer. Said liquid phase 6 may comprise a reducing agent.

In one embodiment, the disk 2 is rotated at a speed of between 40 and 100 rpm, and more preferably between 40 and 60 rpm. The force exerted on the graphite-based material 5 was 2.5 bars, and its rotation speed was between 3000 and 10,000 rpm, preferably 5000.

The method in accordance with the invention makes it possible to directly deposit, on a given substrate, graphene sheets with a predefined number of layers, by selecting a suitable bearing force during the mechanical thinning, for example by using a potentiometer regulating the bearing force and the speed of friction of the material on the surface of the substrate, or by means of a cantilever of an atomic force microscope, of which one of the examples below illustrates the feasibility. In this latter embodiment, a tip of graphite-based material M is fixed on the tip or at the cantilever of an atomic force microscope, and graphene-based conductive circuits are drawn directly on substrates such as glass, silicon coated with a thin silica film, or polymers. It is also possible to create a surface completely covered with graphene sheets by friction of a graphite bar of suitable size on the surface of a substrate. This substrate may be based on various materials, such as silica, silicon, glass or polymers, with a suitable roughness.

A method using electronic printing techniques may also be used in order to prepare thin films containing FLGs. In this case, the FLGs are mixed with another compound, such as a suitable polymer, and this mixture is then deposited on a substrate, preferably planar, in the form of a film or any other geometric form enabling the method to be carried out. If necessary, sonication makes it possible to remove the excess layers in the liquid medium, which may then be used in other applications.

The method in accordance with the invention also makes it possible to improve the graphene output, and in particular using inexpensive and industrially available base materials, such as pencil leads or graphite bars; the methods for producing these base materials are mastered by the manufacturers and can, if necessary, be adapted to the specific requirements of the method in accordance with the invention, for example the sizes and hardness of the material parts. In particular, the method for producing graphene sheets in accordance with the invention makes it possible to obtain high outputs, on the order of 2 to 60% and more, generally between 10 and 40%.

The method in accordance with the invention can be performed without any external heating requirements or the addition of toxic chemical compounds, by comparison with other methods of the prior art. In addition, the method in accordance with the invention is very easy to industrialize, as each step uses simple and known techniques.

The FLGs thus obtained may be used directly as a suspension, as is, or after concentration by techniques known to a person skilled in the art. In particular, they may be used in the production of polymer composites, as described in the following examples, or in the production of electronic circuits.

As an example, it is possible to disperse the dispersion obtained, optionally after concentration (for example by evaporation of solvent), in another solution containing polymers. These may be polymers dispersible in an aqueous medium (such as latex) or a non-aqueous medium. After dispersion and homogenization of the polymer mixture (optionally by heating), it is shaped to obtain a polymer product. The inventors found that it may be advantageous to add carbon nanofibers or nanotubes to the graphene dispersion.

In another embodiment, electronic circuits are produced by microscopic injection of the dispersion (advantageously concentrated) by means of an injection nozzle, or by deposition on a masked circuit followed by a heat treatment for stabilizing the deposition and a chemical treatment for removing the protective mask from said circuit

EXAMPLES

The following examples are intended to illustrate embodiments of the invention. They do not limit the scope of the invention.

Example 1

Synthesis of Graphene Sheets by Friction of a Pencil Lead on a Rough Surface Followed by Sonication/Reduction in Toluene In this example, the multilayer graphene sheets (or FLG) were generated by friction of a pencil lead (hardness HB with a friction surface of around 1 mm$^2$) on a ground glass surface having a roughness of around 1 µm. The roughness of the surface of the glass was measured by profilometry and the value given is a mean value obtained at a distance of 2 mm. After friction, the glass was sonicated (power of 40 Watts) in a toluene solution in order to detach the graphene sheets weakly anchored to the surface. The operation was repeated multiple times in order to obtain an amount of graphite or carbon on the order of 100 mg in a solution of 100 mL of toluene. The reduction of graphene sheets was performed by adding 300 mg of NaBH$_4$ to the solution. The suspension was then kept under agitation (400 rpm) for 30 minutes so as to complete the reduction. The suspension was left to settle for 60 minutes and the clear supernatant solution was collected for analysis. The purification of the excess NaBH$_4$ and binders present in the starting material was performed by a phase transfer with an aqueous acid solution followed by a separation of the two phases by techniques known to a person skilled in the art.

The sheets thus obtained were examined by transmission electron microscopy (TEM) coupled with electron diffraction. This combined technique makes it possible to determine precisely whether the number sheets constituting the FLG, obtained by this method, is one, two or three or more. The images representing the FLG obtained by this method are shown in FIG. 2. The low-resolution image makes it possible to determine that the multilayer graphene formed has a medium size ranging from two to more than ten micrometers (FIG. 2A). The diffraction of electrons performed on the graphene sheets shows the presence of diffraction spots of a hexagonal lattice corresponding to the graphite structure. The medium-resolution image (FIG. 2B) shows that the material is constituted by assemblies of smaller graphene sheets, i.e. on the order of several hundred nanometers. The high-resolution TEM image produced on the edge of the sheets shows that the number of layers is four and eight, respectively (FIG. 2C).

Example 2

Synthesis of Multilayer Graphene Sheets by Friction of a Pencil on a Rough Surface Followed by Sonication in a Toluene Solution. Influence of the Sedimentation Time In this example, the multilayer graphene sheets (or FLG) were generated by friction of a pencil lead (hardness HB) on a ground glass surface having a roughness of around 1 µm (mean value over a distance of 2 cm). The roughness of the surface of the glass was measured by profilometry. After friction, the glass was sonicated (power of 40 Watts) in a toluene solution in order to detach the graphene sheets weakly anchored to the surface. The operation was repeated multiple times in order to obtain an amount of graphite or carbon on the order of 100 mg in a solution of 100 mL of toluene. The suspension was then subjected to sonication with a higher power (250 Watts) for fifteen minutes in order to better separate the graphene sheets weakly stuck together. The suspension after sonication was left then to settle and samples at different intervals were collected in order to analyze the quality of the graphene sheets obtained, and the output.

The sheets thus obtained as a function of the sedimentation time were examined by transmission electron microscopy (TEM). The images representing the graphene obtained with different sedimentation time intervals are shown in FIG. 3. The sample collected after 5 minutes of sedimentation consisted of sheets with a mean size on the order of 2 to 5 µm (FIG. 3A). A TEM image with a mean resolution (FIG. 3B) shows that the sheets are a mixture of sheets of different thicknesses ranging from two or three to several tens of layers. A longer sedimentation (20 minutes instead of 5 minutes) enabled the sheets containing several tens of layers to be removed (FIGS. 3C to F). However, the graphene sheets remain relatively thick, i.e. two or three to more than twenty sheets. A 40-minute sedimentation enabled the graphene sheets with a relatively low thickness, ranging from two or three to a maximum of around fifteen layers, to be collected (FIGS. 3F to H). The size of the sheets remains similar as a function of the sedimentation time, around 2 to 5 µm.

Example 3

Synthesis of Mono- and Bilayer Graphene Sheets by Friction of a Pencil Lead on a Rough Surface Followed by Sonication/Reduction in an Ethanol Mixture: Toluene Containing NaBH$_4$ In this example, the multilayer graphene sheets (or FLG) were generated by friction of a pencil lead (hardness HB) on a ground glass surface having a roughness of around 1 µm. The roughness of the surface of the glass was measured by profilometry and the value given is a mean value obtained over a distance of 2 mm. After friction, the glass was sonicated (power of 40 Watts) in an ethanol/toluene solution (50:50, vol:vol) containing 4% by weight of NaBH$_4$ (the latter acting as a reducing agent), for a period of five minutes in order to detach the graphene sheets weakly anchored to the surface. The operation was repeated multiple times in order to obtain an amount of graphite sheets on the order of 100 mg. The sheets thus obtained were examined by transmission electron microscopy (TEM) coupled with electron diffraction. This combined technique makes it possible to determine precisely whether the number of sheets constituted by the graphene, obtained by this method, is one, two or three or more. The images representing the graphene obtained by this method are shown in FIG. 4. The low-resolution image makes it possible to determine that the graphene formed has a mean size ranging from 2 to more than ten micrometers (FIG. 4A). The high-resolution image (FIG. 4B) shows that the FLG material is constituted by two graphene layers.

The thickness of the graphene sheets was also characterized by atomic force microscopy (AFM). The images obtained by AFM are shown in FIG. 8. The statistical analyses indicate that the graphene sheets obtained have a mean thickness of between 2 and 8 nm.

Example 4

Synthesis of Graphene Sheets by Friction of a Pencil Lead on a Rough Surface Followed by Sonication/Reduction in an Ethanol Medium The synthesis of graphene sheets in this example was performed in accordance with the same principle as in Example 1; the liquid medium was pure ethanol. After synthesis, the liquid ethanol medium containing graphene sheets and carbon residues was heated at 80° C. for 30 minutes. After cooling and sedimentation, the sediments essentially consisted of thick graphite fragments while the thin graphene sheets were in suspension in the supernatant liquid.

The low-resolution TEM observation shows that the sheets have a mean size of around 2 to 6 μm (FIGS. 5A and B). The presence of carbon nanosheets is also observed in this image. The medium-resolution TEM image shows that the graphene sheets formed have a tendency to roll up as shown by the presence of folds on the sheet (FIG. 5C). The TEM analyses show that, with this treatment, some of the graphene sheets formed are rolled back on themselves to form carbon nanosheets with an open central channel (FIG. 5D). It may be thought that, during the heat treatment in ethanol, some of the graphene sheets roll back on themselves to form carbon nanorollers. This phenomenon has not been observed in the case of sheets dispersed in a toluene-based medium.

Example 5

Graphene Output Friction of a Pencil Lead on a Rough Surface Followed by Sonication in Toluene or in Water The synthesis was performed as in Example 1. The pencil lead had an effective surface (i.e. a friction surface) of around 1 mm$^2$. The glass had a roughness of 5 μm and provided a friction surface of 15 cm$^2$. The graphite or carbon concentration in the toluene solution was 200 mg.L$^{-1}$. The suspension was then subjected to sonication with a power of 250 Watts. The duration of the second sonication was variable. The sonicator used in this case was a probe sonicator. The suspension was then left to settle at ambient temperature for 1 h, then the clear supernatant suspension was collected. This suspension was evaporated at 120° C. in an oven in order to collect the black solid constituted by the graphene sheets. The output was then calculated in accordance with the following formula: $(M_{solid\ collected}/M_{graphite/carbon\ in\ the\ suspension}) \times 100$.

The graphene outputs varied as a function of the sedimentation time of the suspension and also as a function of the nature of the solvent used (Table 1).

TABLE 1

| A) Sonication in toluene | | | |
|---|---|---|---|
| Duration of sedimentation [min] | 5 | 20 | 40 |
| Total mass [mg of graphite/100 ml of toluene] | 78 | 78 | 78 |
| Mass collected after sedimentation [mg of graphene/100 ml of toluene] | 43 | 34 | 29 |
| Output [%] | 56 | 44 | 37 |
| B) sonication in water | | | |
| Duration of sedimentation [min] | 5 | 20 | 40 |
| Total mass [mg of graphite/100 ml of toluene] | 92 | 92 | 92 |
| Mass collected after sedimentation [mg of graphene/100 ml of toluene] | 37 | 19 | 16 |
| Output [%] | 40 | 21 | 17 |

Example 6

Synthesis of Graphene by Friction of a Pencil Lead on a Rough Surface Followed by Sonication in Water The synthesis was performed in accordance with Example 1, but, this time, the toluene solution was replaced with distilled water. The graphene dispersion in the water was then subjected to sonication with a higher power, 250 Watts instead of 40 Watts, for 15 minutes in order to disperse the graphene sheets that were still weakly assembled to one another. The mixture was left to settle then and the analyses were performed on the samples as a function of the sedimentation time.

The associated outputs were calculated by complete evaporation of the solution in an oven at 100° C. The total output with respect to the amount of graphite extracted, determined after a 20-minute sedimentation, was on the order of 20%. The multilayer graphene sheets obtained generally contained fewer than twenty sheets and had a mean size on the order of several micrometers.

Example 7

Synthesis of a Multilayer Graphene/Carbon Nanotube Composite for its Use as an Additive in the Production of Conductive Polymers The graphene synthesis was performed in accordance with one of the examples described above. The suspension containing graphene sheets was collected from the solution after sonication and sedimentation. 1 g multilayer carbon nanotube (mean diameter of 100 nm and mean length of 2 mm), previously sonicated in 100 mL of toluene, was added. The mixture thus obtained was then subjected to sonication (250 Watts) for 30 minutes, then left to settle at ambient temperature for one hour. The mixture was then heated at 100° C. in an oven in order to partially evaporate the solvent. The suspension after evaporation of some of the liquid is then redispersed in another solution containing polymers dispersible in an aqueous medium, such as Latex. After homogenization, the Latex-FLG mixture is then deposited by techniques known to a person skilled in the art on a planar substrate for subsequent applications. The substrate may also be heated after deposition of the mixture in order to form the desired composite.

Example 8

Etching of a Circuit by Deposition of a Graphene Layer by Means of a Graphite Tip Attached to a Cantilever of an Atomic Force Microscope The circuit was produced by deposition of graphene lines by means of a pencil lead tip (or another sufficiently fine tip made of graphite-based material) attached to a cantilever of an atomic force microscope (AFM), in which said cantilever is connected to a piezoelectric device that enables a controlled movement of the tip in the three directions in space. The deposition was performed by contact between the tip and the substrate, in this case silicon coated with a thin silica film. The deposition was then observed by a conventional atomic force microscope tip. It is observed that the deposition is fairly regular in accordance with the model defined. The thickness of the measured deposited graphene layer was around 2 nm (equivalent of two graphene sheets) and it was homogeneous over the entire length of the deposition. This example clearly shows that it is possible to draw a graphene-based nanoscopic circuit on substrates using the etching force of an atomic microscope tip. By varying the conditions of friction between the tip and the substrate, a layer with a thickness of between 1 nm and 10 nm is obtained.

What is claimed is:

1. A method for producing a dispersion of one of graphene particles and graphene sheets in a liquid medium, the method comprising:
    providing a graphite-based material including at least 10% by mass of graphite;
    rubbing the surface of said graphite-based material on the surface of a substrate so as to create a trace of friction of said graphite-based material on said surface of said substrate; and then
    soaking said substrate in a liquid medium and subjecting said liquid medium to ultrasound in order to detach said trace from said surface of said substrate to obtain a dispersion of the one of graphene particles and graphene sheets in said liquid medium after rubbing the surface of said graphite-based material.

2. The method of claim 1, wherein said graphite-based material is chosen from pencil leads, natural graphite and synthetic graphite.

3. The method of claim 1, wherein the liquid medium comprises a reducing agent selected from the group consisting of: $NaBH_4$, hydrazine and ammonia.

4. The method of claim 3, further comprising
    separating any organic material or inorganic material present in said dispersion, by sedimentation or centrifugation, or by chemical dissolution.

5. The method of claim 4, further comprising
    reducing said dispersion of graphite particles and/or graphene sheets that may be present in said dispersion including a thickness that exceeds a predetermined value, by sedimentation or by centrifugation.

6. The method of claim 5, further comprising
    collecting the graphene sheets from said suspension, and re-dispersing said graphene sheets in a liquid phase.

7. The method of claim 1, wherein said surface of said substrate has a roughness of between 0.01 μm and 10 μm.

8. The method of claim 7, wherein the thickness of the one of said graphene particles and graphene sheets is between 1 and 50 nm, and/or the number of parallel graphene sheets is between 1 and 15.

9. The method of claim 1, wherein the speed of friction between said graphite-based material and said surface of said substrate is between $0.001$ $m.s^{-1}$ and $0.1$ $m.s^{-1}$.

10. The method of claim 1, wherein said substrate is selected from polymers, flexible polymers, transparent polymers, glasses, ceramics and silicon.

11. The method of claim 1, wherein said surface of said substrate and said graphite-based material are in relative movement to cause a lateral offset between two adjacent segments of traces of said graphite-based material on said surface of said substrate.

12. The method of claim 11, wherein:
    said substrate is a disk configured to rotate about its axis; and
    the trace of friction of said graphite-based material on said surface of said substrate is one of continuously and periodically offset by lateral displacement means so as to obtain a continuous trace in the form of a spiral.

13. The method of claim 1, wherein at least some of said dispersion is collected one of periodically and continuously.

14. The method of claim 1, further comprising subjecting said dispersion to a second ultrasound treatment for a duration of time which is greater than that of the first ultrasound treatment.

15. The method of claim 14, further comprising subjecting said dispersion to a microwave heating treatment after the second ultrasound treatment.

16. The method of claim 1, further comprising collecting the one of said graphene particles and said graphene sheets from said suspension.

17. The method of claim 1, wherein the graphite-based material includes at least 50% by mass of graphite.

18. The method of claim 1, wherein the graphite-based material includes a geometric shape of a block or a rod.

19. A device for producing a dispersion of one of graphene particles and graphene sheets in a liquid medium, the device comprising:
    means for holding a graphite-based material including at least 10% by mass of graphite;
    a substrate equipped with a surface configured for contact with said graphite-based material;
    means for enabling a relative displacement between said graphite-based material and said substrate;
    means for one of regulating, controlling and measuring a pressure force between said graphite-based material and said surface of said substrate;
    a liquid container for receiving a liquid and configured to permit at least a partial immersion of said surface of said substrate in said liquid; and
    an ultrasound generator configured to subject said liquid to ultrasound waves.

20. The device of claim 19, further comprising means for one of a continuous and a periodic drainage of liquid from said liquid.

* * * * *